3,574,521
MODIFICATION OF CELLULOSIC TEXTILE MATERIALS WITH DIVINYL SULFONE PRECURSORS
Giuliana C. Tesoro, Dobbs Ferry, N.Y., and Paul I. Linden, North Arlington, N.J., assignors to J. P. Stevens & Co., Inc., New York, N.Y.
No Drawing. Continuation-in-part of applications Ser. No. 826,133, July 10, 1959, and Ser. No. 51,778, Aug. 25, 1960. This application Jan. 3, 1961, Ser. No. 79,988
Int. Cl. D06m 13/28; C08b 11/04, 19/06
U.S. Cl. 8—116.2
11 Claims

ABSTRACT OF THE DISCLOSURE

Active hydrogen containing polymers are modified in the presence of an alkaline catalyst with divinyl sulfone precursors.

This application is a continuation in part of application Ser. No. 826,133 filed July 10, 1959, now abandoned, and application Ser. No. 51,778 filed Aug. 25, 1960, now U.S. Pat. No. 3,000,762.

The present invention relates to novel processes by which polymers containing active hydrogen atoms are crosslinked with polyfunctional sulfone compounds to increase their water resistance and dimensional stability and the novel products resulting therefrom.

Among the polymers contemplated are natural polymers such as cellulose, proteins, starches and the like, and synthetic polymers such as polyvinyl alcohol, partially saponified polyvinyl esters and the like. The polymers can be non-fiber forming (e.g. starch, soluble cellulose, polyvinyl alcohol resin and the like), or they can be fiber forming polymers (e.g. cotton cellulose, regenerated cellulose, wool keratin, polyvinyl alcohol fiber and the like). In the case of fiber forming polymers containing active hydrogens, the textile structures manufactured from them are particularly suitable as raw materials for the processes of the invention since the modification of textile materials such as fibers, yarns, filaments, woven fabrics, knitted fabrics and non-woven fabrics with polyfunctional reagents is known to result in highly desirable properties. In addition to increasing water resistance and dimensional stability, the reaction of textile materials with crosslinking reagents also increases resilience. The modification of textile materials in fabric form and in flat condition increases crease recovery and flat drying properties, and the treated fabrics thus exhibit properties which greatly increase their usefulness. In addition, fabrics treated in creased or pleated condition, will permanently retain the creases or pleats imparted in the course of the treatment. Thus flat drying properties and permanent creases which are retained in the course of laundering and dry cleaning can be imparted to fabrics by the processes of our invention.

Many processes are known by which similar objectives can be achieved, but all known processes have serious shortcomings. Generally speaking, known processes for the modification of fibrous polymers containing active hydrogen and more particularly of the textile materials made from them, fall into two categories: (1) treatment with thermosetting resins which are reacted by baking or curing in presence of acidic or acid generating catalysts and (2) treatment with alkylating agents in presence of concentrated alkaline solutions which swell the fibers greatly. Processes in the first group usually involve the use of nitrogenous reagents containing formaldehyde, and cause objectionable persistent odors in the processing, storage and use of the fabrics. Furthermore, the chemical bonds formed in the reaction with the polymer are susceptible to hydrolytic attack and to retention of chlorine from bleaching solutions, so that the treatment is often removed, altered and impaired in the course of normal laundering procedures. Processes in the second group also have serious shortcomings. The necessity for employing concentrated alkaline solutions makes the processes unsuitable for use on alkali-sensitive polymers (e.g. regenerated cellulose). Furthermore, due to the strong swelling action of the alkaline solution, the reaction takes place while the polymer is in a highly swollen condition; and in the case of textile materials, this leads to improved resilience in the wet state only, with dry resilience remaining unchanged or even being impaired.

In an effort to overcome the disadvantages recited above for known treatments, the use of divinyl sulfone as a reagent has been suggested. This reagent

reacts readily at room temperature with compounds containing active hydrogen in the presence of catalytic amounts of alkaline compounds. It is an effective crosslinking agent for polymeric compounds containing active hydrogen generally, and for fiber forming polymers in particular. However, its use on an industrial scale has not been possible since the physico-chemical and physiological properties of the reagent constitute an insurmountable barrier to its use in conventional installations.

Divinyl sulfone is an extremely toxic chemical, orally and by absorption through the skin. It is a powerful lachrymator and vesicant. It is a liquid of relatively high vapor pressure, and therefore difficult to handle (as for example in weighing). At alkaline pH (9.0 and above), it reacts readily with water so that aqueous alkaline solutions of divinyl sulfone have very limited stability.

The conversion of divinyl sulfone to certain water soluble derivatives which liberate divinyl sulfone in the presence of alkaline reagents can successfully overcome the difficulties associated with the use of divinyl sulfone itself, but it is essential to react the compounds under carefully selected conditions, since by improper choice of reaction conditions the problems mentioned above for the reaction of divinyl sulfone will be retained, and in some cases, even aggravated.

Accordingly it is an object of this invention to provide a process for crosslinking polymers containing active hydrogen atoms with polyfunctional sulfone compounds to increase the water resistance and dimensional stability of said polymers. It is a further object of this invention to provide a process for crosslinking polymers containing active hydrogen atoms with polyfunctional sulfone compounds whereby the shortcomings noted above for existing processes are substantially eliminated.

It is a further object of this invention to provide a process for crosslinking polymers containing active hydrogen atoms with polyfunctional sulfone compounds under moderate reaction conditions whereby the water resistance and dimensional stability of said polymers are increased.

A further object of this invention is to provide novel polymeric materials which are made by crosslinking polymers containing active hydrogen atoms with polyfunctional sulfone compounds under moderate reaction conditions.

Further objects of this invention will be apparent from the description which follows.

In accordance with the present invention the process contemplates contacting selected polyfunctional sulfone compounds or divinyl sulfone derivatives with polymers containing active hydrogen under moderate conditions in the presence of a solvent medium pursuant to a prescribed sequence of steps. In addition this invention includes the novel products resulting from this process and which are characterized by having improved water resistance and dimensional stability.

The divinyl sulfone derivatives contemplated in this invention can be represented by the general Formula I

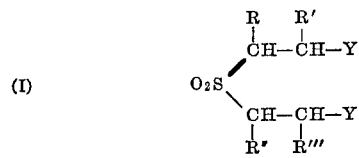

(I)

where R, R′, R″, R‴ are selected from the group consisting of hydrogen and lower alkyl, and Y represents a polar residue derived from a reagent of weak nucleophilic character such as the cation of a weak base (e.g. pyridinium, quinolinium and the like) and the anion of a strong acid (e.g. $SO_3Na$ or thiosulfate, $—OSO_3Na$ or sulfate and the like). Nucleophilic character is defined as the tendency to donate electrons or share them with a foreign nucleus (Gilman, Oragnic Chemistry, second edition, vol. II, p. 1859). More specifically, Y can be derived from a tertiary amine having an ionization constant lower than about $10^{-5}$, or it can be derived from an inorganic polybasic acid having an ionization constant higher than about $10^{-5}$, or from an organic or organically substituted inorganic acid:

The following are specific examples of compounds suitable for the process of the invention, and included among the compounds of Formula I, (II) 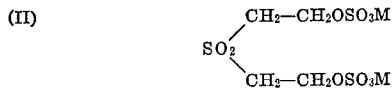

where M is selected from the group consisting of alkali metal and ammonium, (III) 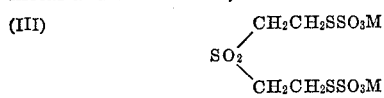

where M has the same meaning as in Formula II.

(IV) 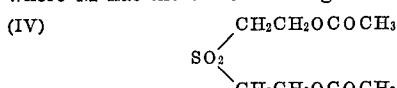

(V) 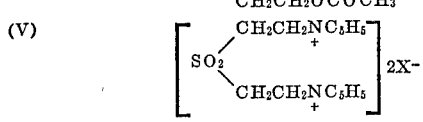

where X is a halogen.

(VI) 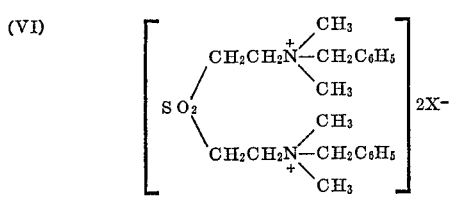

where X is a halogen.

(VII) 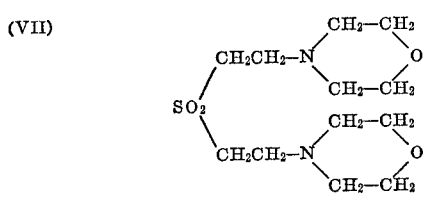

and its salts.

Specific examples of alkaline materials suitable for the process of the invention are the phosphates, carbonates, hydroxides, alkoxides and silicates of alkali metals; the quaternary ammonium hydroxides, and generally compounds which are strong bases, but are not capable of reacting with divinyl sulfone. The alkali hydroxides are preferred bases, since they are readily available, easily soluble and economical.

The following important conditions must be fulfilled when these compounds are reacted with polymers containing active hydrogen and more particularly with textile materials such as fabrics:

(1) The treatment of textile materials, and particularly fabrics, is generally carried out by impregnation from aqueous solutions which must be stable, since they are normally used over a prolonged period of time either continuously or at intervals. In the process of this invention, the fabric is contacted with a stable, aqueous, neutral solution of the sulfone and is treated with the alkaline component of the reaction system in a separate step. These steps can be carried out in any sequence, with or without intermediate drying, but the preferred procedure consists of impregnation with the sulfone solution, followed by drying and by impregnation with the alkaline material. If the alkali is added to the sulfone solution in order to carry out the treatment of the fabric in a single step, the solution immediately begins to liberate lachrymatory fumes and becomes very difficult to handle. Furthermore, within a short time, water insoluble by-products begin to form within the solution which soon becomes ineffective for the desired fabric treatment. Accordingly the polymer should not be simultaneously contacted by the sulfone and alkali but contact should be sequentially. As noted above the polymer can first be contacted by the sulfone followed by the alkali or vice versa, but in either instance the polymer should be present during contact of the sulfone and alkali so that the divinyl sulfone formed can react with the polymer as fast as it is formed, thereby avoiding the liberation of noxious fumes and the formation of undesirable by-products.

(2) When soluble polymers are treated (as distinguished from textile structures), the two-step procedure outlined above is not always feasible, and the following alternate condition should be fulfilled. The polymer (e.g. starch) is intimately mixed with the neutral, stable sulfone solution. The alkaline material is then added gradually, so that reaction takes place as rapidly as the reagent is formed. If the alkali is added to the sulfone solution prior to addition of the polymer, side reactions begin to set in immediately, and the yield in the reaction of the sulfone with the polymer is severely impaired.

(3) The reaction between the sulfone, alkali and polymer should preferably be allowed to proceed at moderate temperatures and in the presence of water or an inert solvent. The use of elevated temperatures in the presence of alkaline materials causes severe discoloration and damage of the treated polymers, and furthermore, often causes decomposition of the sulfone compound, with formation of undesirable and unreactive by-products. For example, heating of the compound of Formula III with a polymer in the presence of alkaline material results in extensive decomposition of the reagent, poor yields of treated polymer, and an unsightly brown discoloration which cannot be eliminated by common bleaching procedures. The presence of water or solvent is advantageous, and actually essential in some instances. The water or suitable solvent carries the reagent into the polymer and allows the reaction to take place at room temperature. If the water is removed, the reaction can no longer take place unless the system is heated; and heating is undesirable for the reasons given above.

In summary then, the process of the present invention consists of contacting the sulfone compounds of Formula I with polymers containing active hydrogen, in the presence of an alkali reaction medium which can contain water or other suitable solvent, at a temperature below the boiling point of the solvent employed, and by a sequence of steps which insures solution stability and uniformity of treatment over prolonged periods of time.

By employing the process of this invention for the treatment of textile fabrics such as cellulosic fabrics, products of greatly improved properties can be obtained. Crease recovery properties and wash/wear effects are greatly enhanced, pleats and mechanical effects are retained, excellent dimensional stability is achieved. According to the process of this invention, the fixation of such non-cellulosic stiffening or sizing agents as starch, gelatine, and polyvinyl alcohol can also be greatly improved. All these properties are substantially permanent to laundering, and impervious to chlorine bleaches, scouring processes and other cleaning procedures.

For the treatment of fabrics, the concentration of sulfone employed can be varied widely, depending on the extent of modification desired. Concentrations between 5% and 30% based on the weight of polymer reactant can be employed.

The amount of the alkaline compound should be at least equivalent to the amount of sulfone present on or in the polymer, and can be much greater. When a large excess of alkali is employed, the reaction is almost instantaneous and caution must be exercised to limit the reaction time to a maximum of about 3 hours and preferably to about 30 minutes, since prolonged standing (even at room temperature) of the treated polymer in contact with a large excess of strong base can cause the reaction to be reversed, and the yield to decrease. When essentially stoichiometric amounts of the sulfone and alkali are employed, the reaction time is not critical, and can be varied from 10 minutes to 24 hours without significant change in the reaction yield or in the properties of the treated polymer. Thus, the reaction time at room temperature can be varied from a few seconds to many hours, depending on the basic strength and amount of the alkaline component. The required reaction time decreases with increasing base strength and with increasing amounts of base.

The following examples are illustrative of the present invention although it will be understood that these examples are not to be construed as limitative of the scope of the invention.

EXAMPLE I

A plain weave cotton fabric (commonly referred to as 80 x 80 print cloth) was impregnated with an aqueous solution containing 280 parts of the product

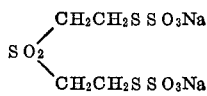

in 720 parts of water, and the excess solution was removed by passing through squeeze rolls set at such pressure that the wet pickup was approximately 100%. The impregnated fabric was dried at 35–40° C. The dried fabric containing the sulfone was somewhat stiff. It was then impregnated with an aqueous solution containing 80 parts of sodium hydroxide in 920 parts of water. The amount of sodium hydroxide solution picked up by the fabric was approximately 58%, based on the original fabric weight. Thus, the amount of sodium hydroxide present on the fabric during the reaction was 4.7%, based on the original fabric weight. After the second padding operation, the fabric was allowed to stand at room temperature in the wet state for 15 minutes, then thoroughly washed with Triton X-100 (a non-ionic detergent manufactured by the Rohm & Haas Chemical Co.) solution and dried. The cotton fabric thus treated was soft to the touch, and exhibited greatly improved wet crease recovery and dry crease recovery over untreated fabric.

When this fabric was washed by usual laundering procedures it exhibited an outstanding ability to dry flat and wrinkle-free without ironing. An untreated fabric washed and dried simultaneously had a wrinkled and unsightly appearance. This property of drying smooth and flat without requiring ironing is a result of the treatment described in this example.

EXAMPLE II

A viscose rayon gabardine fabric was treated with a 25% aqueous solution of the product used in Example I. The wet pickup was approximately 100%. The fabric was dried at 50° to 60° C., then treated with a 9% solution of potassium hydroxide, rolled smoothly and allowed to stand wet at room temperature for 30 minutes. The fabric was thereafter neutralized with dilute acetic acid, washed and dried. The following table shows the recovery properties of the treated fabric and of the untreated control fabric. The Crease Recovery was determined by the method described in the Technical Manual of the Association of Textile Chemists and Colorists 1959 edition, vol. 35, pp. 171–173 (Tentative Test Method 67–1957) and is expressed as the sum of values obtained in warp and filling directions. The wash/wear properties were determined by the method described in the same publication (p. 154–156) and are expressed by the recommended indices.

TABLE I

| Viscose gabardine | Crease recovery (W+F) | | Wash/wear rating 1 after 5 launderings at 140 °F. | |
|---|---|---|---|---|
|  | Wet | Dry | Line dried | Tumble dried |
| Untreated | 187 | 202 | 1.0 | 1.5 |
| Treated (Ex. 2) | 255 | 225 | 4.0 | 4.5 |

[1] Ratings from 1.0 (worst appearance) to 5.0 (best appearance).

In addition, while the untreated fabric had a shrinkage of 7.0% (warp) and 5.0% (filling) after 5 launderings, the treated fabric did not show any measurable shrinkage.

EXAMPLE III

The procedure of Example I was repeated, except that the bis (β-pyridiniummethyl) sulfone dichloride

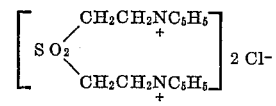

was used in place of the thiosulfate compound for the treatment of the same cotton fabric.

The properties of the treated fabric are illustrated by the following crease recovery values, determined by the methods indicated above.

TABLE II

| 80 x 80 cotton | Crease recovery (W+F) | |
|---|---|---|
|  | Wet | Dry |
| Untreated | 144 | 125 |
| Treated (Ex. III), Sample A | 314 | 231 |
| Treated (Ex. III), Sample B | 298 | 245 |

EXAMPLE IV

A cotton fabric was treated with a 25% solution of the disodium salt of the bis-sulfuric acid ester of bis-beta hydroxyethyl sulfone

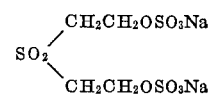

by the procedure described in the preceding examples. It was then washed at 70°–75° C. with a solution containing 3 grams per liter of soda ash and 3 grams per liter of a nonionic detergent. The weight ratio of wash solution to fabric was 50/1. Samples of the fabric were removed from the wash solution at intervals, rinsed and dried. The recovery properties of each sample were determined, and the following table summarized the results obtained.

TABLE III

| Time in wash solution at 70°-75° | Wet crease recovery, W+F | Dry crease recovery, W+F |
| --- | --- | --- |
| 0 | 294 | 198 |
| 15 minutes | 300 | 213 |
| 1 hour | 295 | 201 |
| 2 hours | 282 | 202 |
| 4 hours | 284 | 201 |
| 6½ hours | 307 | 200 |

Table III shows that the properties imparted by our treatment are substantially permanent to washing.

EXAMPLE V

Forty-four grams of a 10% aqueous solution of a partially saponified polyvinyl acetate (containing about 40% residual acetate product marketed as Gelvatol 40–10 by the Shawinigan Resin Corp.) were mixed with 32 grams of a 25% solution of the sulfone compound

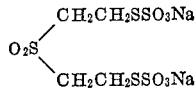

A clear solution resulted. Upon adding 17.6 grams of a 25% aqueous solution of sodium hydroxide, an insoluble polymer immediately precipitated. This was washed with dilute acetic acid, then with water and dried. The polymer was insoluble in boiling water.

EXAMPLE VI

Sixty-two grams of a 7% solution of polyvinyl alcohol (obtained by total hydrolysis of polyvinyl acetate product marketed as Gelvatol 1–60 by the Shawinigan Resin Corp.) were mixed with 0.3 grams of a 25% solution of the sulfone used in Example 5. Upon adding 0.2 grams of a 25% solution of sodium hydroxide an insoluble polymer precipitates which was filtered, washed and dried. This product was insoluble in boiling water.

EXAMPLE VII

One hundred-fifty grams of corn starch (Pearl Corn Starch—Clinton Industries, Inc.) were stirred with a solution containing 200 grams of water, 10 grams of a 25% solution of the sulfone of Example 5 until a homogeneous slurry was formed. This slurry was then treated with 100 grams of 3% sodium hydroxide solution, and the mixture was allowed to stand at room temperature. At the end of 1 hour, the solid was filtered, washed with dilute acetic acid and water.

A test portion of the solid product (1 gram) was suspended in 10 grams of water and the water was brought to a boil. The modified starch product swelled slightly, while the untreated starch formed a thick gelatinous mass when tested by the same procedure.

EXAMPLE VIII

Samples of yarn manufactured from unmodified polyvinyl alcohol fiber (non-heat treated, yarn size 25/1) were impregnated with an aqueous solution containing 250 grams per liter of the sulfone compound

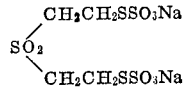

The yarn was passed through the squeeze rolls of a laboratory padder, adjusting the pressure of the rolls so as to give a wet pickup of about 75%. The uptake of sulfone was thus about 18 grams per 100 grams of yarn. The yarn so treated was dried, then passed through a 10% potassium hydroxide solution, squeezed through the rolls of the padder and allowed to stand at room temperature for 30 minutes. It was then washed in dilute acetic acid and water, and dried. The yarn so treated is insoluble in boiling water, while the untreated yarn was gradually dissolved when immersed in water at 70°–80° C.

EXAMPLE IX

Samples of cotton fabric were treated with solutions of the following composition, passed through the rolls of a laboratory padder set to give about 70% wet pickup, and dried:

| Sample | Solution |
| --- | --- |
| a | 7.7% Kosol starch (cold water sol. starch—a product of the National Starch and Chemical Co.). |
| b | 7.7% Kosol starch plus 1.5% sulfone of Example 3. |
| c | 7.7% Kosol starch plus 4.6% sulfone of Example 3. |
| d | 7.7% Kosol starch plus 4.6% of a 25% solution of the sulfone of Example 5. |
| e | 7.7% Kosol starch plus 9.2% of a 25% solution of the sulfone of Example 5. |
| f | 6.2% polyvinyl alcohol resin (Gelvatol 1–90—a product of the Shawinigan Resin Corp.). |
| g | 6.2% polyvinyl alcohol (Gelvatol 1–90) plus 6.2% of a 25% solution of the sulfone of Example 5. |
| h | 6.2% polyvinyl alcohol (Gelvatol 1–90) plus 23.1% of the sulfone of Example 3. |

After drying, the samples were treated with a 10% solution of sodium hydroxide, passed through the squeeze rolls of a laboratory padder and allowed to stand at room temperature for 1 hour. After neutralizing washing and drying, all samples exhibit varying degrees of body and stiffness. It will be noted that samples (a) treated with starch only, and (f) treated with polyvinyl alcohol only, lose their stiffness after one machine laundering at 140° F., while the hand, feel and stiffness of all other samples remained essentially unchanged through 5 or more machine launderings at 140° F. These experiments demonstrate the insolubilization of starch and polyvinyl alcohol sizing materials in situ by the process of our invention.

Other fabrics besides cotton can be treated in this manner. For example, fabrics manufactured from regenerated cellulose, polyamide, polyester and acrylic fibers can be so treated if a stiff finish which is durable to laundering is desired.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

We claim:

1. A process for treating a cellulosic textile material containing free hydroxyl groups in a cellulose molecule which comprises treating said cellulosic material with a sulfone in the presence of an alkaline compound and solvent, said sulfone having the structure selected from the group consisting of:

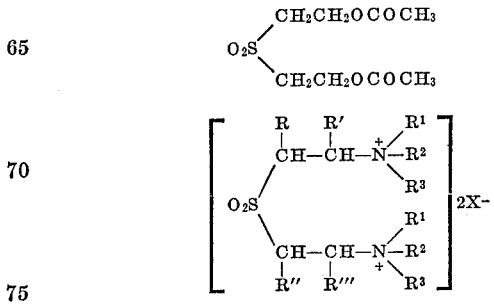

and

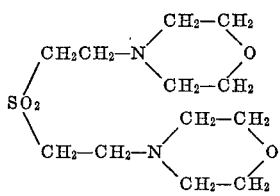

wherein R, R', R" and R'" are selected from the group consisting of hydrogen and lower alkyl; $R^1$, $R^2$ and $R^3$ are selected from the group consisting of alkyl, aryl, and alkaryl substituents of a tertiary amine having an ionization constant lower than about $10^{-5}$, X is a negatively charged ion derived from an acid selected from the group consisting of halogen, sulfuric, nitric, methanesulfonic and benzenesulfonic acids, the alkaline compound being in sufficient quantity to neutralize a substantial portion of the acidic component formed from said polar residue, the solvent being present during reaction to produce a crosslinked cellulosic molecule of changed properties, said process being carried out in the absence of a noncellulosic polymer containing hydroxy groups capable of reacting with said sulfone.

2. The process of claim 1 in which the cellulosic material is contacted first with the sulfone and then with the alkaline compounds.

3. The process of claim 1 in which the cellulosic material is contacted first with the alkaline compound and then with the sulfone.

4. The process of claim 1 in which the cellulosic material is a cellulosic fabric.

5. The process of claim 1 wherein the temperature of the reaction between the sulfone and the cellulose molecule is below the boiling point of the solvent and the period of time for the reaction ranges from a few seconds to about 24 hours.

6. The process of claim 1 wherein the sulfone is

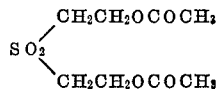

7. The process as defined in claim 1 which is carried out by impregnating the textile with the solution of the sulfone, drying the textile and impregnating the dried textile with a solution of the alkaline compound and allowing the impregnated textile to stand in the wet state.

8. The process as defined in claim 1 which is carried out by impregnating the textile with a solution of the sulfone, impregnating the textile with a solution of the alkaline compound and allowing the impregnated textile to stand in the wet state.

9. A process as defined in claim 1 which is carried out by impregnating the textile with the solution of the alkaline compound, drying the textile and impregnating the dried textile with a solution of the sulfone and allowing the impregnated textile to stand in the wet state.

10. The process as defined in claim 1 which is carried out by impregnating the textile with a solution containing the alkaline compound, impregnating the textile with a solution of the sulfone and allowing the impregnated textile to stand in the wet state.

11. The product of the reaction of a sulfone with a cellulosic textile material according to the process as defined in claim 1.

References Cited

UNITED STATES PATENTS

| | | | |
|---|---|---|---|
| 3,033,682 | 9/1961 | Tesoro | 117—139.5R |
| 2,985,501 | 5/1961 | Gagarine | 8—Sulfone |
| 2,524,399 | 10/1950 | Schoene et al. | 8—Sulfone |
| 2,474,808 | 7/1949 | Schoene | 260—607 |
| 2,670,265 | 2/1954 | Heyna et al. | 8—120 |
| 2,539,704 | 1/1951 | Schoene et al. | 8—116X |
| 2,955,016 | 10/1960 | Moore | 8—128 |
| 2,524,400 | 10/1950 | Schoene et al. | 8—Sulfone |
| 3,031,435 | 4/1962 | Tesoro | 8—Sulfone |

OTHER REFERENCES

Stahmann et al., "J. of Organic Chemistry," Mar. 22, 1946, pp. 719–735.

GEORGE F. LESMES, Primary Examiner

J. CANNON, Assistant Examiner

U.S. Cl. X.R.

8—115.5, 115.7, 120, 128; 260—91.3, 231, 233.3